United States Patent
Bourke-Dunphy et al.

(10) Patent No.: US 7,206,828 B1
(45) Date of Patent: Apr. 17, 2007

(54) LOCATION-BASED SCENARIOS TO FACILITATE SELECTION OF SYSTEM CONFIGURATION

(75) Inventors: Erin M. Bourke-Dunphy, Seattle, WA (US); Jeff A. Zimniewicz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 843 days.

(21) Appl. No.: 09/710,143

(22) Filed: Nov. 10, 2000

(51) Int. Cl.
  *G06F 15/177* (2006.01)
  *G06F 15/173* (2006.01)
  *G06F 9/445* (2006.01)
  *G06F 9/44* (2006.01)

(52) U.S. Cl. ............... 709/221; 709/223; 717/176; 717/171

(58) Field of Classification Search ........... 717/121, 717/168–178; 709/200–203, 220–226
See application file for complete search history.

(56) References Cited

U.S. PATENT DOCUMENTS

| | | | | |
|---|---|---|---|---|
| 5,414,846 | A * | 5/1995 | Lemble et al. ........... | 713/1 |
| 5,666,501 | A * | 9/1997 | Jones et al. ........... | 345/748 |
| 5,758,154 | A | 5/1998 | Qureshi ............... | 713/1 |
| 5,963,743 | A * | 10/1999 | Amberg et al. ........ | 717/174 |
| 6,006,035 | A * | 12/1999 | Nabahi ............... | 717/175 |
| 6,167,567 | A * | 12/2000 | Chiles et al. .......... | 717/173 |
| 6,202,207 | B1 * | 3/2001 | Donohue ............. | 717/173 |
| 6,282,711 | B1 * | 8/2001 | Halpern et al. ........ | 717/175 |
| 6,725,377 | B1 * | 4/2004 | Kouznetsov ........... | 726/23 |
| 2003/0097430 | A1 * | 5/2003 | Matsukura ............ | 709/221 |
| 2004/0249909 | A1 * | 12/2004 | Matsukura ............ | 709/221 |

OTHER PUBLICATIONS

Loshin, P.; "Netscape's Enterprising Server Upgrade", *BYTE (International Edition)*, vol. 22, No. 5, May 1997, p. 123.
Harrington, A.; "State of the Art [Windows 2000]", *CA Magazine*, May 2000, p. 44-45.
Hapgood, F.; "Windows of Opportunity [Web Site Tools]", *Inc. Tech.*, vol. 12, No. 4, Dec. 1999, p. 114, 116, 118, 121, 122, 124, 126, 128.
Kozel, K.; "Corel's Click & Create: It's All in the Game", Emedia Professional, vol. 10, No. 1, Jan. 1997, p. 92-96.
Tezuka, S., et al.; "PC-LAN Construction Support Tool: Easy Installer", Transactions of the Information Processing Society of Japan, vol. 37, No. 2, Feb. 1996, p. 300-311.
Demetriadis, S., et al.; "'Graphical' Jogthrough: Expert Based Methodology for User Interface Evaluation, Applied in the Case of an Educational Simulation Interface", *ED-MEDIA*, 1999, p. 285-299.
Nakanishi, H., et al.; "Object-Oriented Data Handling and OODB Operation of LHD Mass Data Acquisition System", *Fusion Engineering and Design*, 2000, p. 135-142.
Fertitta, K., et al.; "The State of Interchangeability in ATE", 2000 IEEE Autotestcon Proceedings. *IEEE Systems Readiness Technology Conference. Future Sustainment for Military Aerospace*, 2000, p. 417-424.

* cited by examiner

*Primary Examiner*—Anthony Nguyen-Ba
(74) *Attorney, Agent, or Firm*—Amin, Turocy, & Calvin, LLP

(57) ABSTRACT

Information is acquired indicative of a location scenario where a plurality of software components are to be installed. The location scenario is employed to configure the software components, such as by setting at least some of the components as default components to facilitate selection and/or configuration of the software components during a setup process. The location scenario is further employed to configure selected components to have functionality based on the location scenario.

21 Claims, 9 Drawing Sheets

LOCATION-BASED SCENARIOS TO FACILITATE SELECTION OF SYSTEM CONFIGURATION

TECHNICAL FIELD

The present invention relates to computer programming and, more particularly, to a system and method to facilitate configuration and/or setup of a software system based on its installation location.

BACKGROUND

Software applications and/or services are commonly offered to consumers in the form of grouped packages or suites, in which two or more such applications are provided. A suite is generally provided at a lower cost than if the individual applications included therein were purchased separately. In addition, a software suite typically includes an assortment of related and/or interoperable application or service components targeted to satisfy the software needs of a particular type of customer, such as small businesses or other types of organizations. Different application suites may thus be provided to satisfy various market needs, where certain segments of software consumers commonly require more than one application or service.

It is common to selectively install different applications of a suite onto one or more interconnected computers. For example, an organization may include several servers physically located at different locations, e.g., one server at a corporate central office, with additional servers located at remote locations. The particular application and/or services that should be installed at each server in the organization may vary as a function of the type of organization and the performance objectives of the administrator that implements the installation.

During one type software installation, a user may be presented with a list that provides several functional descriptions of different installation scenarios from which the user is to select. However, the choices presented may fail to provide a suitable functional definition for the installation based on the customer's objectives as to how the software is to be utilized in the organization. For example, the computer onto which the software is being installed may fall within the functional definitions associated with more than one of the available choices. As a result, a user may be confused as to the appropriate selection for the installation. Moreover, if the user were to select an incorrect option for the installation, one or more components that the user may need at that computer may not be made available for installation, which could require reinstallation. Therefore, it is common for a user to exit a functionality-based setup process and proceed with a custom installation. However, a custom installation typically provides little or no guidance as to what components should be selected for a given type of installation.

Other types of software may provide a limited number of installation choices, such as to implement a complete installation or a minimal installation. The complete installation usually installs all available components onto the user's computer, with little or no tuning to the user's situation. A minimal installation usually installs only those components that are necessary for the software to function properly. Both of these options lack adequate tuning of the installation according to where the software is being installed.

Therefore, it is desirable to provide a system and method to help configure a software system during an installation process according to the location of the computer.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention provides a system and method to facilitate selection and/or configuration of software components during installation of a software system. Information is acquired indicative of a computer location onto which application components are to be installed. For example, a graphical user interface may provide a discrete number of selections describing two or more location-based scenarios from which a user may select an appropriate response. Alternatively, the system location information may be acquired from a system registry or other data storage.

The software system is configured as a function of the acquired location information. The configuration characteristics, which may include system infrastructure and/or functionality of the software system, further may be employed to tune functionality associated with one or more system components according to the location information. As a result, system functionality may be tailored according to the location information to provide desirable functionality based on the location information.

Another aspect of the present invention provides a method for configuring a software system. The method includes selecting a scenario based on a location of where the software system is to be installed and determining a configuration for the software system based on the selected scenario. In accordance with an aspect of the present invention, the method may be implemented as computer-executable instructions in a computer-readable medium.

Yet another aspect of the present invention provides a system for facilitating configuration of a software system. The system includes an interface component for receiving information indicative of a location scenario relating to where the software system is being installed. Configuration characteristics for the software system are determined based on the location scenario.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

The present invention relates to a system and method to facilitate selection and/or configuration of software components during a setup process associated with installation of a plurality of software components. Information is acquired indicative of a location onto which the components are to be installed. The location information is employed to configure the software components, such as by setting at least some of the components as default components.

Figure 1:
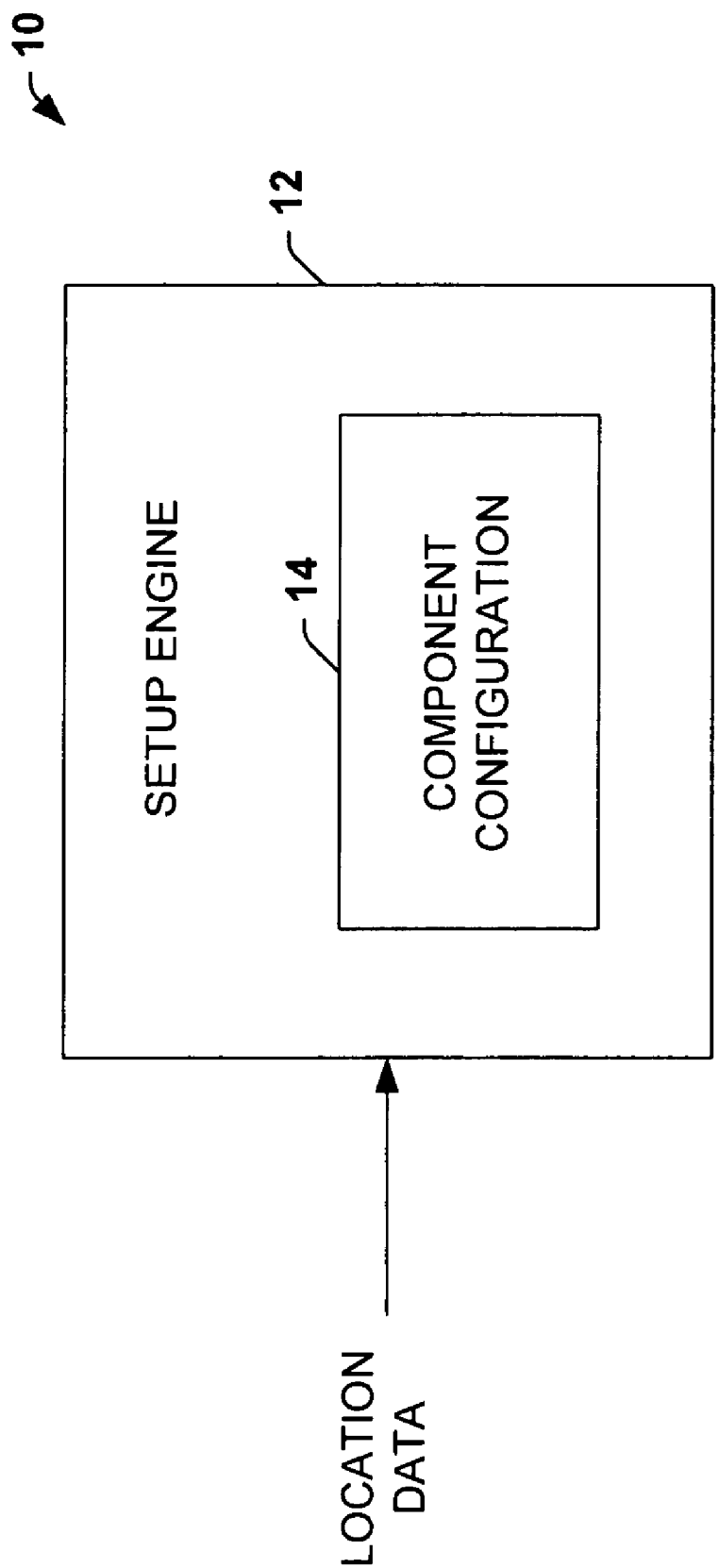
FIG. 1 is a functional block diagram of a system to facilitate configuring a software system in accordance with the present invention.

FIG. 1 is a diagrammatic representation of a system 10 that may be utilized to facilitate configuration of application and/or service components of a software system in accordance with an aspect of the present invention. The system 10 includes a setup engine 12 programmed to configure a software system for installation onto a computer. The setup engine 12 receives location data indicative of a location for the computer, such as a server, onto which a software system is being installed. The location information may be entered by a user at an appropriate user interface and/or be determined from data stored in the computer or a directory service (e.g., a distributed directory) of an associated network domain to which the computer belongs. For example, the setup engine 12 may collect selected data from a system registry and, upon application of a suitable algorithm, deduce an indication of the computer location sufficient to drive the setup process in accordance with an aspect of the present invention.

The software system being installed includes a plurality of components, such as may be server-based applications or Web-based services, although the system 10 may be employed to facilitate configuration of other types of software systems. The setup engine 12 determines a desirable component configuration 14 based on the location data. The determined component configuration 14, for example, may be cached to memory and presented to a user in the form of a graphical user interface (GUI). The user may, in turn, accept the recommended (e.g., default) components for installation or customize the components, as desired. The component configuration 14 further includes corresponding configuration information for each of the selected components, in which the functionality of each selected component may further be tuned based on the location data.

Figure 2:
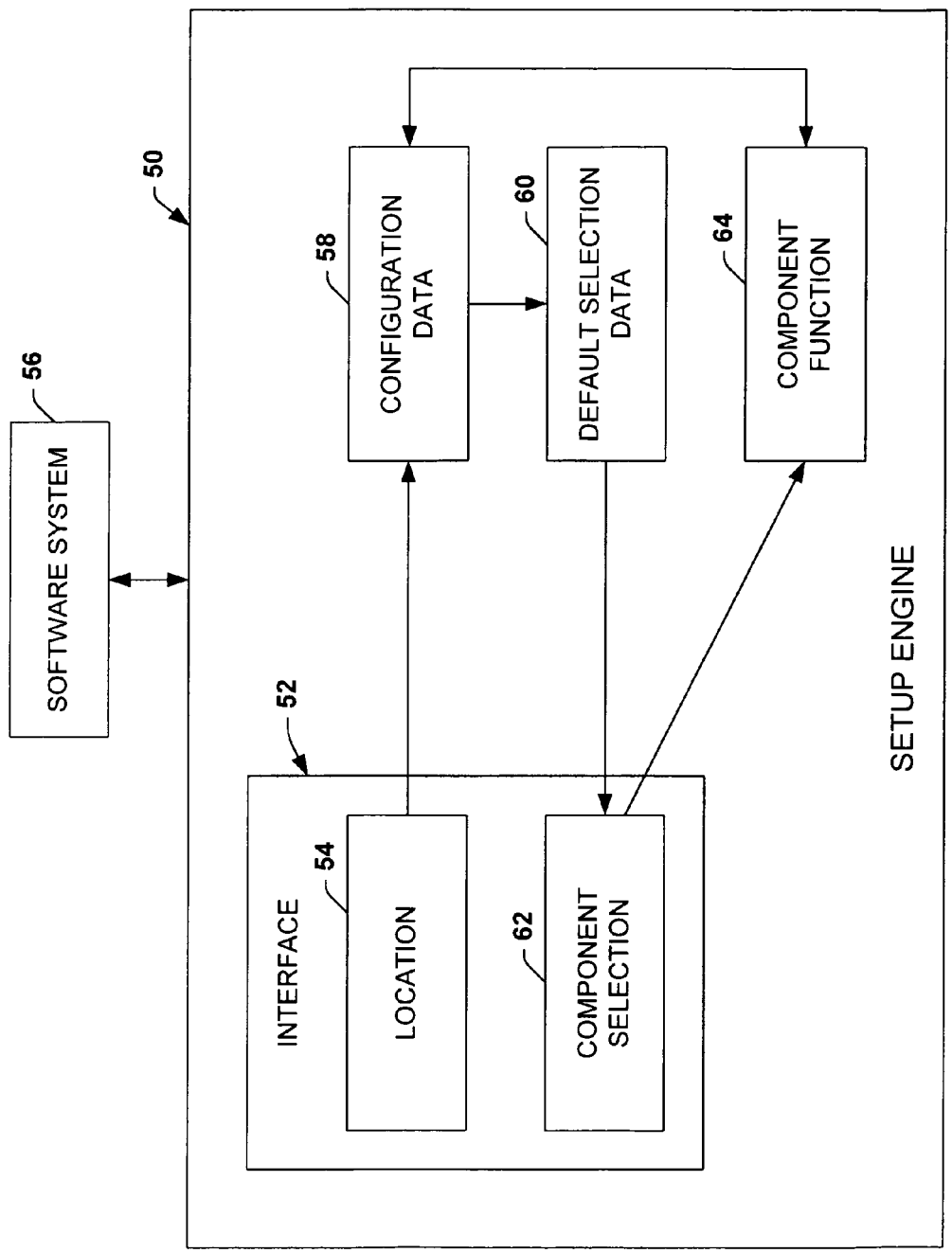
FIG. 2 is a functional block diagram of a system to facilitate configuring a software system in accordance with the present invention.

FIG. 2 illustrates another example of a setup engine 50 in accordance with an aspect of the present invention. In this example, the setup engine 50 includes an interface 52, such a may be a graphical user interface. The interface 52 includes a location interface component 54 that acquires information about the location of a computer onto which a software system is being installed. The location interface component 54, for example, includes a GUI that presents two (or more) selectable options describing possible location scenarios for the computer onto which a software system 56 is being installed. The system 56, for example, is packaged to include components that may be used for a variety of different system environments (e.g., networked or stand-alone computer environments), all of which may be represented by the location interface component 54 as different selectable location scenarios.

By way of illustration, assume that the software system 56 includes a server system having plurality of server components. The components may include a main server component, a database component, a management component, an email component, a fax component, a hosting component, a firewall component, etc. Those skilled in the art will understand and appreciate other possible components that may be desirable to install in connection with a server system, all of which of considered as being within the scope of the present invention. Table I provides a more detailed example of high-level components that could be installed as part of a server system in accordance with an aspect of the present invention.

TABLE I

SERVER SYSTEM

Administration

Consoles
Wizards
Snap-Ins
Remote Management
Web Administrator
Active Directory Configuration
System User Upgrade
System Console Upgrade
System Console Upgrade
Monitoring Health Monitoring
Server Status View
Server Status Report
Monitoring Troubleshooting
Connectivity ICW
POP3 Connector
Client Setup Set Up Computer Wizard
Internet Browser
Messaging Reader
IME
Proxy Client
Modem Sharing Client
Fax Client
Host Integration Client
OS Updates
Documentation Online Guide
Intranet Optional Components Internet Information Server Internet Information Server Snap-In
Internet Information Server Documentation
NNTP
SMTP
World Wide Web Service TABLE I-continued Database System Server Components
Management Tools
Client Connectivity
Books Online
Proxy
Fax
Modem Sharing
Computer Management
Host Integration Server
Messaging and Collaboration System Messaging and Collaboration
System Management Tools Those skilled in the art will understand and appreciate that the foregoing list of server components is for purposes of illustration, and that various different components could be utilized in accordance with an aspect of the present invention. For example, it may be desirable to install a different set of components depending on where the server system is being installed and the particular server system being installed. Moreover, different functionality of certain components may be desired depending upon where the system is being installed.

The setup engine 50 is programmed, in accordance with an aspect of the present invention, to determine configuration data 58 for the software system 56 based on the location information acquired by the location interface component 54. The configuration data 58, for example, may provide default selection data 60, which identifies available components from the software system 56 that have been selected as a function of the location information. The default selection data 60 may contain a list of recommended components for installing at the computer having location characteristics identified by the location interface component 54. The default selection data 60 is provided to a component selection interface element 62. In this way, a list of the default components of the software system 56 may be displayed to a user. The user may then employ the component selection interface 62 to accept some, none, or all of the default components as well as to select other components for installation. That is, the component selection interface 62 provides recommended components for installation based on the location scenario being implemented, but it also is customizable.

The component selection interface 62 provides the user's component selections to a component function element 64. The component function element 64 may configure one or more of the selected components according to the configuration data and the location information. As a result, selected components may be configured to provide a corresponding functionality, which has been tuned according to the location where the software is being installed (e.g., based on the location scenario).

Figure 3:
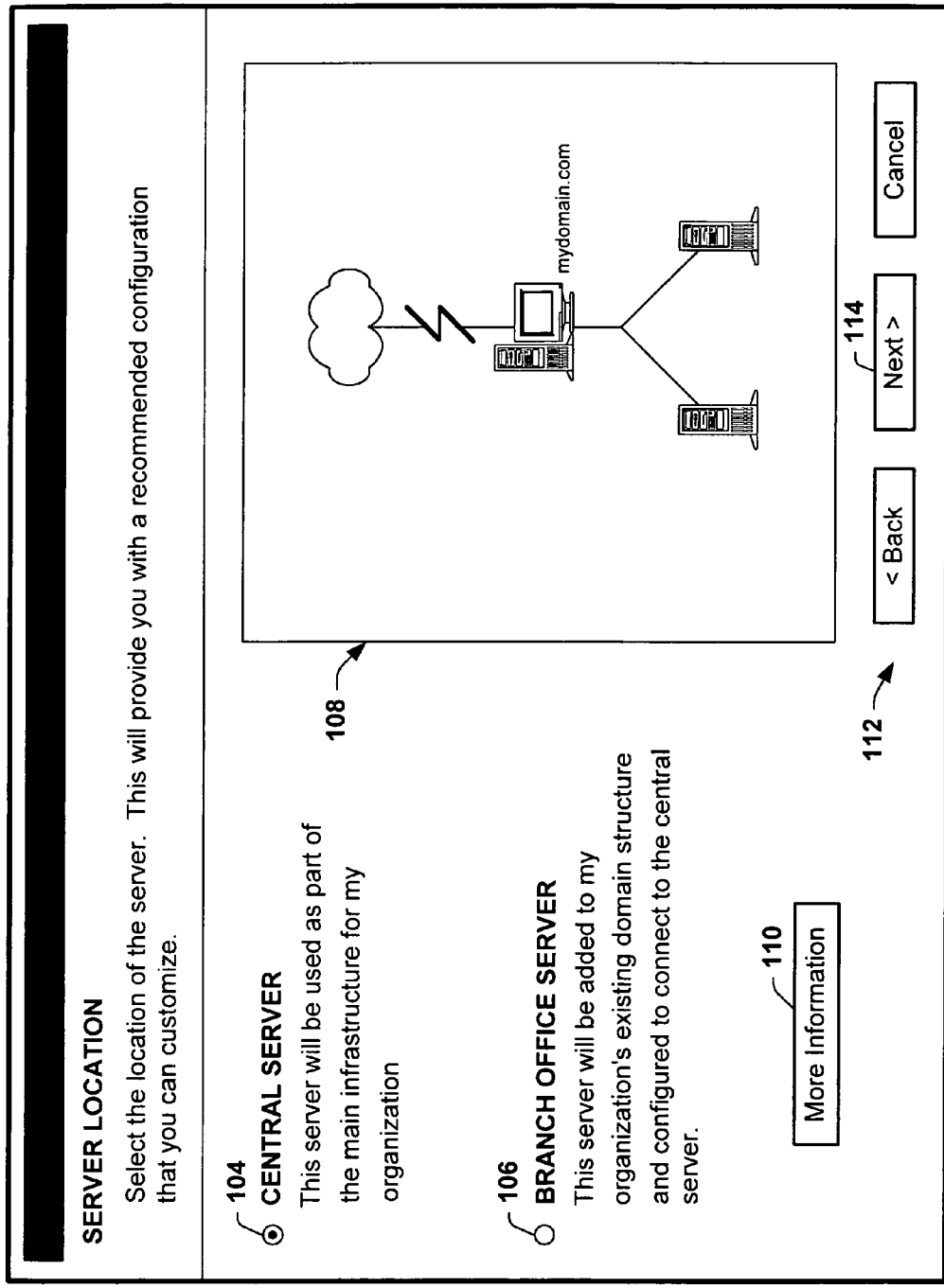
FIG. 3 is an example of a graphical user interface for selecting an installation location in accordance with the present invention.

FIGS. 3–7 illustrates examples of graphical user interfaces (GUIs) that may be utilized to help configure a software system in accordance with an aspect of the present invention. FIG. 3 illustrates a GUI 100 for selecting a computer (e.g., a server) location onto which an associated software system is being installed in accordance with an aspect of the present invention. In this example, two location scenarios are presented as options for installation, although it is to be appreciated that any number of location scenarios could be utilized as possible installation locations in accordance with an aspect of the present invention.

By way of illustration, a first selectable user interface element 104 is associated with the first installation location scenario, namely, a central server location. The user interface element 104 may be selected where a user desires to employ the computer as part of the main infrastructure for an organization. A second user interface element 106 is associated with an alternative installation location. In particular, the second user interface element 106 may be selected where the computer is to be added to an existing domain structure and configured to connect to a central server. In this example, the central server scenario has been selected. An adjacent window 108 displays a graphical example of a computer infrastructure corresponding to the selected user interface element 104.

The selected user interface element 104 results in a recommended configuration for the software system (e.g., a server system) being implemented. That is, the configuration of the associated software system is tuned according to the particular location scenario selected via the GUI 100.

If a user desires additional information concerning the location scenarios presented by the GUI 100, a user may select a MORE INFORMATION action button 110. The action button 110, for example, is associated with a pop-up window that may display additional information associated with the location scenario options 104 and 106. The GUI 100 also includes other action buttons, generally indicated at 112, for navigating a setup process of which the GUI is part. In particular, after selecting a desired installation location scenario, a user may select a NEXT action button 114 for advancing to another GUI screen associated with the setup process. In response to selecting the NEXT action button 114, the setup process (or an associated component thereof) determines a configuration for the software system as a function of the user-selected location scenario.

Figure 4:
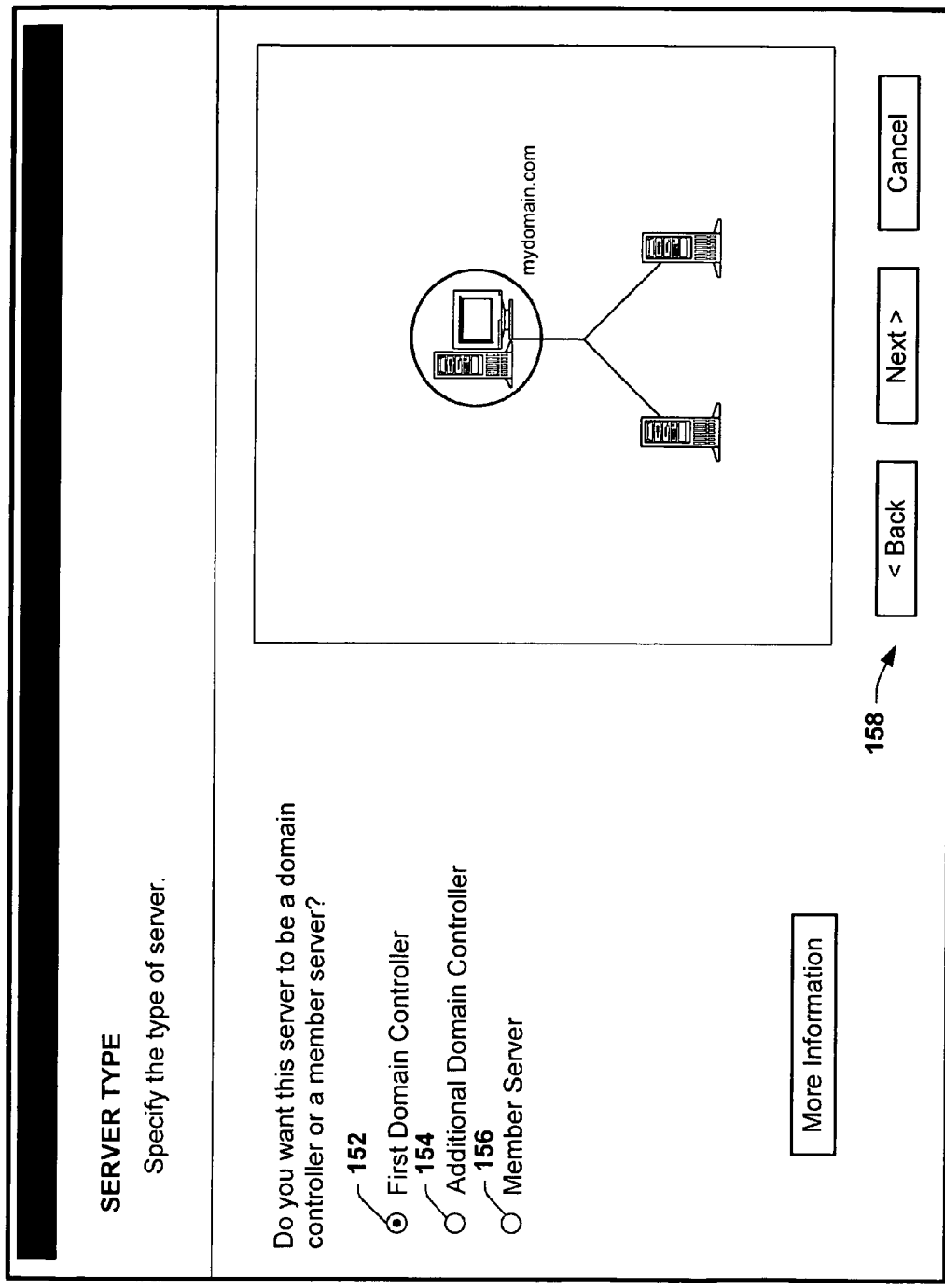
FIG. 4 is an example of a user interface for identifying a type of server in accordance with the present invention.

FIG. 4 illustrates an example of a GUI 150 that may be provided for further configuring the software system. In this example, the software system corresponds to a server and the GUI 150 allows a user to specify the type of server. In particular, the GUI 150 includes selectable user interface elements 152, 154, and 156 for setting the central server as a first domain controller, an additional domain controller, or a member server, respectively. It is to be appreciated that, in accordance with an aspect of the present invention, the GUI 150 may be provided in response to selecting the central server location scenario with the GUI 100 and then activating the NEXT button 114 of FIG. 3. The GUI 150 includes additional action buttons 158 for navigating through the setup screens of the setup process.

Figure 5:
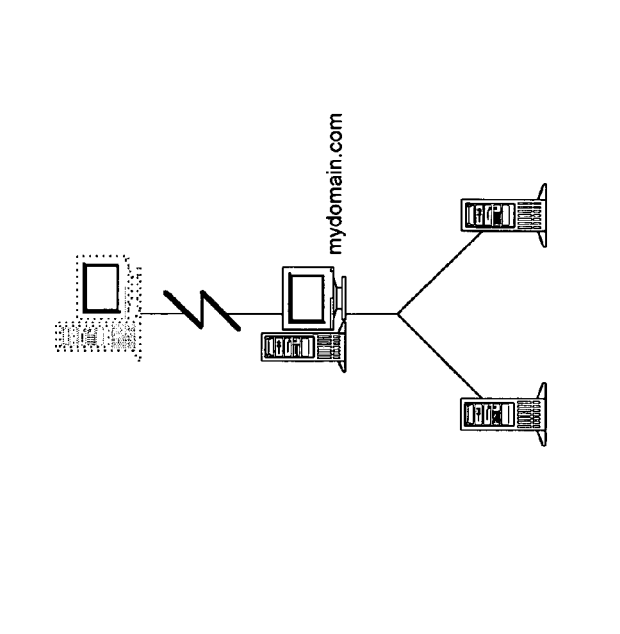
FIG. 5 is another example of a graphical user interface for selecting an installation location in accordance with the present invention.

FIG. 5 illustrates another example of a GUI 200 for selecting a computer location scenario where a software system is being installed. The GUI 200 is similar to the GUI 100 of FIG. 3, but corresponds to a situation where a different location scenario has been selected. In particular, the GUI 200 includes first and second selectable user interface elements 204 and 206 respectively associated with different installation location scenarios. In this example, the branch office server scenario has been selected. An adjacent window 208 displays a graphical example of a computer infrastructure corresponding to the selected user interface element 206, namely a typical infrastructure for a situation where a server is implemented at a branch office location. The GUI 200 includes a MORE INFORMATION button 210 for obtaining additional details concerning characteristics of the location where the software is being installed.

Other action buttons 212 also are provided for general navigation of GUIs associated with the setup process.

Figure 6:
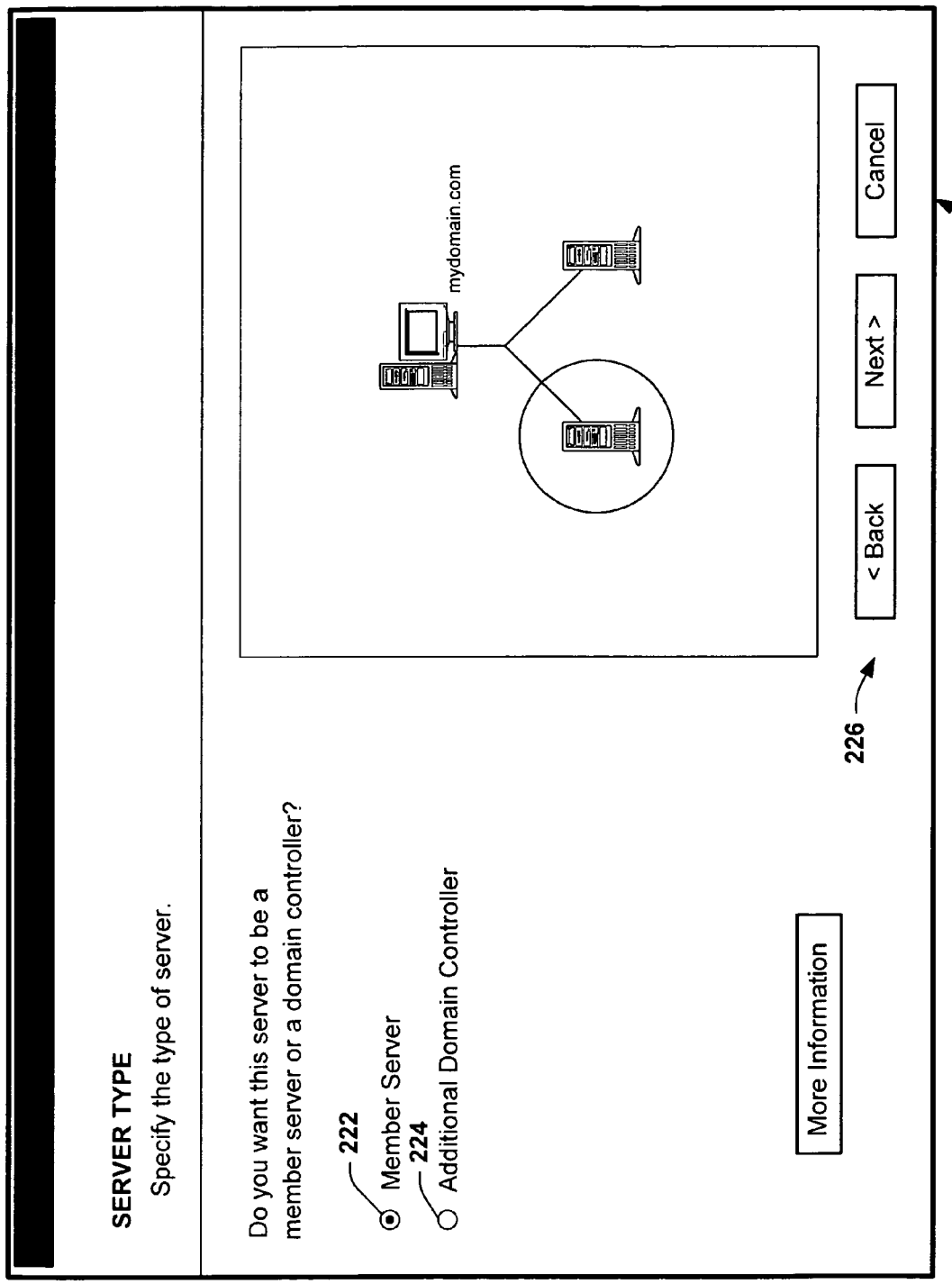
FIG. 6 is another example of a user interface for identifying a type of server in accordance with the present invention.

Upon selecting the branch office server location interface element 206 and selecting a NEXT action button 214, the setup process may provide a GUI 220, such as shown in FIG. 6. In FIG. 6, the GUI 220 includes user interface elements 222 and 224 for specifying a type of server the branch office server where the software system (e.g., a server) is being installed. It is to be appreciated that the server type options presented in this example (e.g., a branch office server) differ from those available where a central server location scenario is selected. That is, configuration options may vary as a function of the selected location scenario. In particular, the user interface element 222 corresponds to selecting the server to be a member server of an existing domain and user interface element 224 is for selecting the server to be an additional domain controller in an existing domain. Action buttons 226 also are provided for navigating through the setup process.

After the server location has been selected, such as based on the two (or more) available location scenarios, such as shown and described with respect to FIGS. 3 and 5, a user is provided with a list of components for recommended installation. In accordance with an aspect of the present invention, the list of components includes default components determined as a function of the selected location scenario (e.g., central server or branch office server). The default components may be automatically selected for installation so as to provide desired functionality associated with the selected location scenario. The user may customize the setup, such as by deselecting one or more of the default components and/or by selecting other available components to be installed. Moreover, upon selecting components for installation, the selected components further may be tuned based on the selected location scenario.

Figure 7:
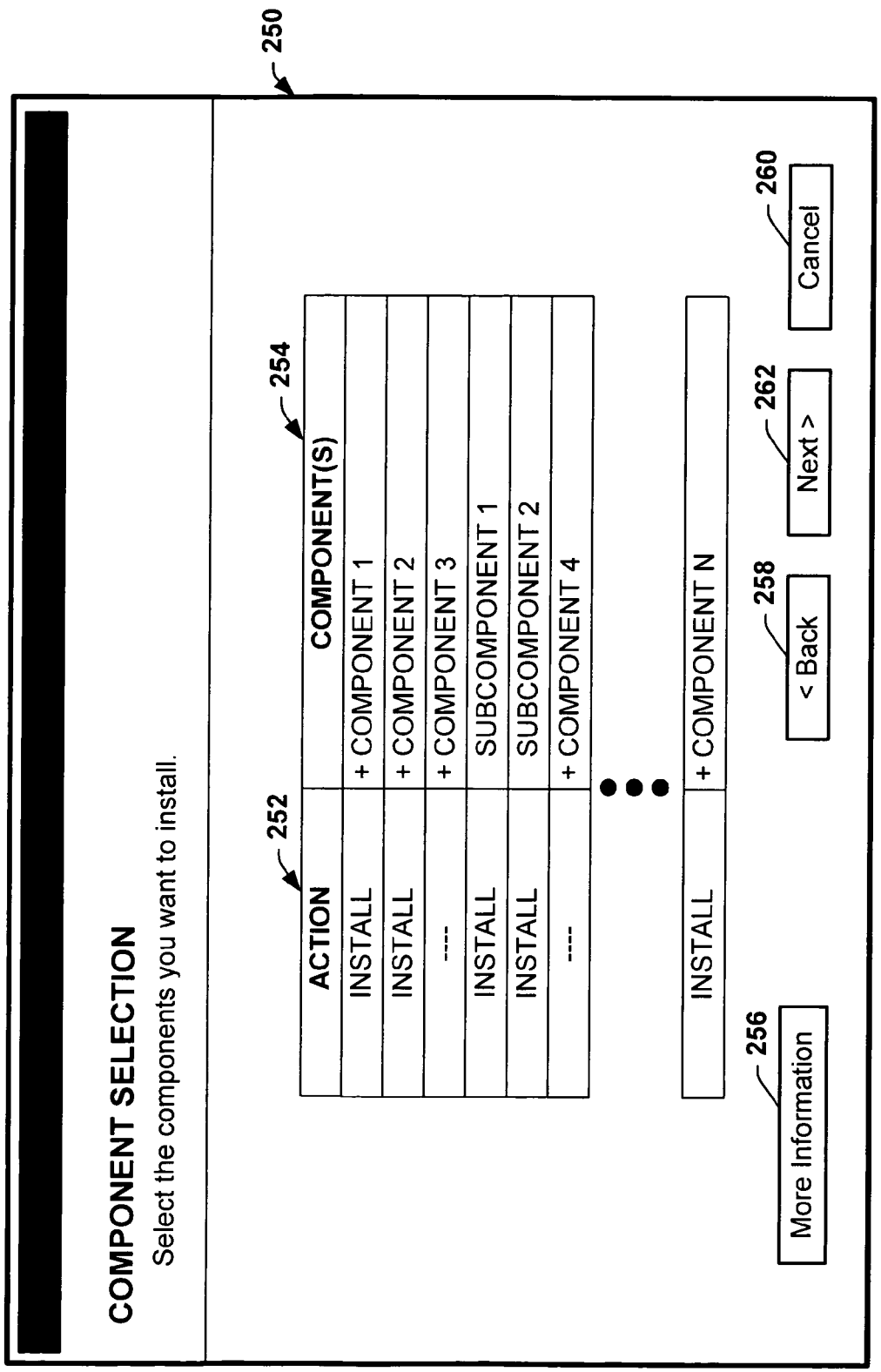
FIG. 7 is an example of a user interface for selecting components in accordance with the present invention.

By way of illustration, FIG. 7 depicts a component selection GUI 250, such as may be provided to the user for selecting which components are to be installed in accordance with an aspect of the present invention. The GUI 250 includes an ACTION user interface element 252. The ACTION user interface element 252 may be employed to select a desired action to perform with respect to each available component. Each interface element 252 may map to an associated component user interface element 254 for indicating what action is to be performed with respect to an associated component (e.g., whether or not the component is selected to be installed). The user interface element 254, for example, may include a drop down menu for displaying subcomponents of the respective components. In this way, a hierarchy of the available components and subcomponents may be shown to the user, from which a user may selectively install each component and/or subcomponent. A dependency manager (not shown) further may be associated with the setup process to help ensure that necessary components and subcomponents are installed. As mentioned above, corresponding components (and associated subcomponents thereof) may be selected for default installation according to the selected location scenario. A user may customize the installation procedure by employing an associated ACTION user interface element 252 to deselect default components so as not to be installed and/or to select other non-default components so as to be installed.

In order to assist a user interact with the GUI 250, the user may select a MORE INFORMATION action button 256. Additionally or alternatively, the MORE INFORMATION action button may be associated with a pop-up window, which may be interactive and displays information about a selected component or subcomponent. A user also may select a BACK action button 258 to return to a previous GUI screen or a cancel button 260 to cancel the current setup and/or installation process.

Once a user is satisfied with the components selected for installation, the user may employ a NEXT action button 262. In response to selecting the NEXT button 262, the associated setup process, in turn, may configure (or tune) particular functionality associated with one or more components and/or subcomponents based on the selected location scenario. In this way, components and/or subcomponents may be configured to have favorable operating characteristics according to where the software system is being installed.

It will be appreciated that the foregoing approach is in contrast to controlling installation of components based on a functionality, as historically has been provided. When a user selects one or more functions to implement with a conventional software system, for example, almost no assumptions may be made about the configuration of the computer because it is uncertain as to where the software system is being installed. Therefore, by utilizing functionality to determine what components to install, a user is provided with preselected components to be installed, which usually cannot be further customized. Moreover, the selected functionality may not adequately correspond to the actual implementation for the software system. Consequently, conventional installation options may not be adequately helpful and may result in a user performing a complete custom installation. By performing a complete installation of all components, the setup process fails to facilitate selections suited for a particular installation.

A system implemented in accordance with the present invention facilitates setup and/or installation of software components by configuring default components to install for a given installation for a selected location scenario. Moreover, the particular functionality of components that have been selected to be installed may be tuned based on the selected location scenario.

Figure 8:
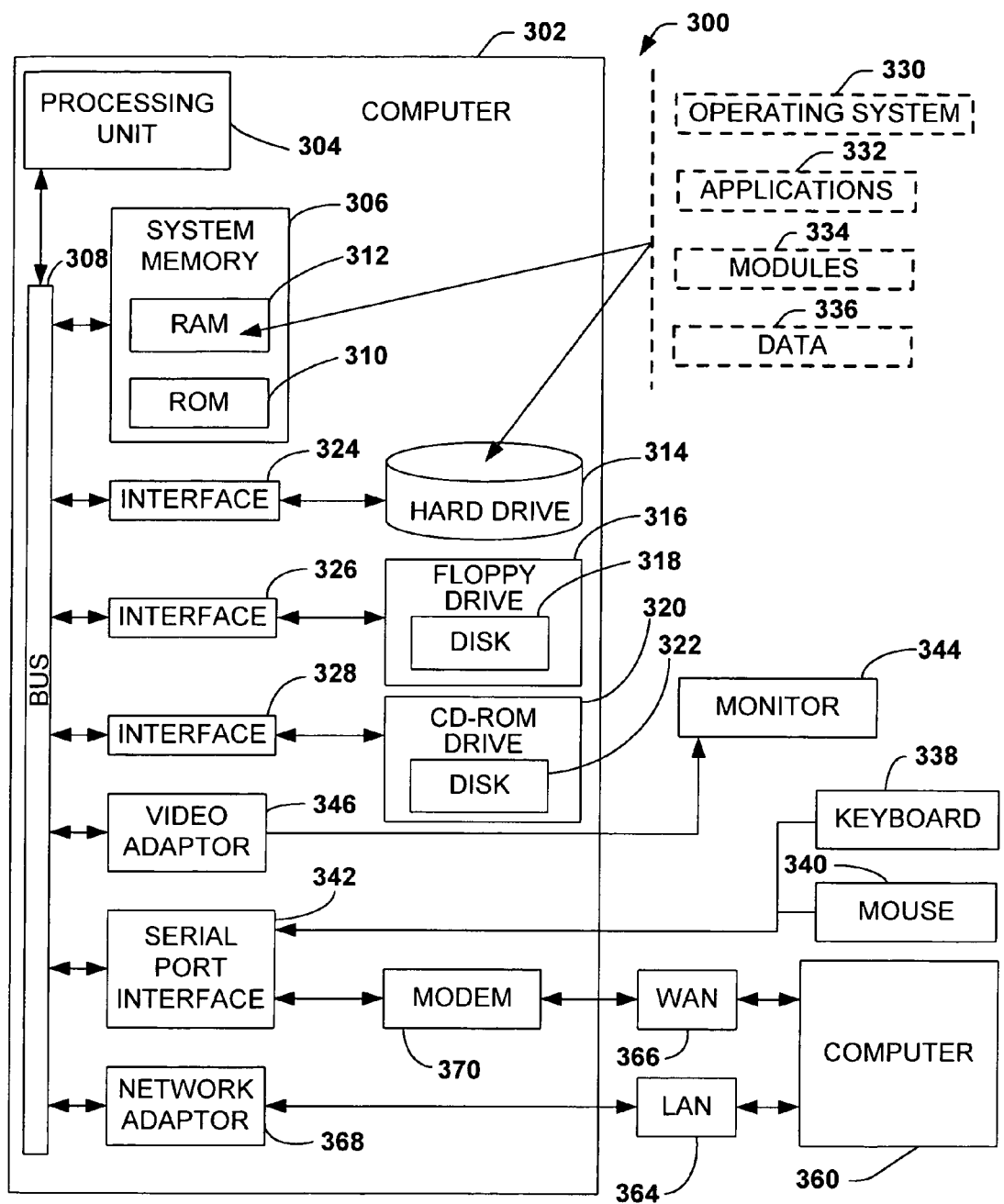
FIG. 8 is an example of a operating environment in which the present invention may be implemented.

With reference to FIG. 8, an exemplary system environment 300 for implementing the various aspects of the invention includes a computer 302, such as a server. The computer 302 includes a processing unit 304, a system memory 306, and a system bus 308 that couples various system components including the system memory to the processing unit 304. The processing unit 304 may be any of various commercially available processors, including but not limited to INTEL X86, PENTIUM and compatible microprocessors from INTEL and others, including CYRIX, AMD and NEXGEN; ALPHA microprocessors from DIGITAL; MIPS microprocessors from MIPS TECHNOLOGY, NEC, IDT, SIEMENS, and others; and the POWERPC microprocessors from IBM and MOTOROLA. Dual microprocessors and other multi-processor architectures also may be used as the processing unit 304.

The system bus 308 may be any of several types of bus structure including a memory bus or memory controller, a peripheral bus, and a local bus using any of a variety of conventional bus architectures such as PCI, VESA, Microchannel, ISA, and EISA, to name a few. The system memory includes read only memory (ROM) 310 and random access memory (RAM) 312. A basic input/output system (BIOS), containing the basic routines that help to transfer information between elements within the computer 302, such as during start-up, is stored in ROM 310.

The computer 302 also may include, for example, a hard disk drive 314, a magnetic disk drive 316, e.g., to read from or write to a removable disk 318, and an optical disk drive 320, e.g., for reading from or writing to a CD-ROM disk 322 or other optical media. The hard disk drive 314, magnetic disk drive 316, and optical disk drive 320 are connected to the system bus 308 by a hard disk drive interface 324, a magnetic disk drive interface 326, and an optical drive interface 328, respectively. The drives and their associated computer-readable media provide nonvolatile storage of data, data structures, computer-executable instructions, etc. for the computer 302. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment 300, and further that any such media may contain computer-executable instructions for performing the methods of the present invention.

A number of program modules may be stored in the drives and RAM 312, including an operating system 330, one or more application programs 332, other program modules 334, and program data 336. The operating system 330 in the illustrated computer is, for example, one of the MICROSOFT WINDOWS® operating systems, which are available from Microsoft Corporation. It is to be appreciated, however, that the present invention may be implemented with other operating systems or combinations of operating systems.

A user may enter commands and information into the computer 302 through one or more user input devices, such as a keyboard 338 and a pointing device (e.g., a mouse 340). Other input devices (not shown) may include a microphone, a joystick, a game pad, a satellite dish, a scanner, or the like. These and other input devices may be connected to the processing unit 304 through a serial port interface 342 that is coupled to the system bus 308, although such devices may be connected by other interfaces, such as a parallel port, a game port, a universal serial bus (USB), etc. A monitor 344 or other type of display device is also connected to the system bus 308 via an interface, such as a video adapter 346. In addition to the monitor 344, the computer 302 may include other peripheral output devices (not shown), such as speakers, printers, etc.

As mentioned above, the computer 302 may operate in a networked environment using logical connections to one or more other computers 360, such as may form part of a common network domain. The remote computer 360 may be a workstation, a server computer, a router, a peer device or other common network node, and typically includes many or all of the elements described relative to the computer 302. The logical connections depicted in FIG. 8 may include a local area network (LAN) 364 and a wide area network (WAN) 366. Such networking environments are commonplace in offices, enterprise-wide computer networks, intranets and the Internet.

When used in a LAN networking environment, the computer 302 is connected to the local network 364 through a network interface or adapter 368. When used in a WAN networking environment, the computer 302 typically includes a modem 370, or is connected to a communications server on the LAN, or has other means for establishing communications over the WAN 366, such as the Internet. The modem 370, which may be internal or external, is connected to the system bus 308 via the serial port interface 342 (e.g., for communications over POTS). The modem alternatively may be connected to the system bus 308 via the network interface or adapter 368 (e.g., for communication over DSL, cable, satellite, etc.). In a networked environment, program modules depicted relative to the computer 302, or portions thereof, may be stored in the remote memory storage device. It will be appreciated that the network connections shown are exemplary and other means of establishing a communications link between the computers 302 and 360 may be used.

In accordance with the practices of persons skilled in the art of computer programming, the present invention has been described with reference to acts and symbolic representations of operations that are performed by a computer, such as the computer 302 or remote computer 360, unless otherwise indicated. Such acts and operations are sometimes referred to as being computer-executed. It will be appreciated that the acts and symbolically represented operations include the manipulation by the processing unit 304 of electrical signals representing data bits which causes a resulting transformation or reduction of the electrical signal representation, and the maintenance of data bits at memory locations in the memory system (including the system memory 306, hard drive 314, floppy disks 318, CD-ROM 322) to thereby reconfigure or otherwise alter the computer system's operation, as well as other processing of signals. The memory locations where such data bits are maintained are physical locations that have particular electrical, magnetic, or optical properties corresponding to the data bits.

Figure 9:
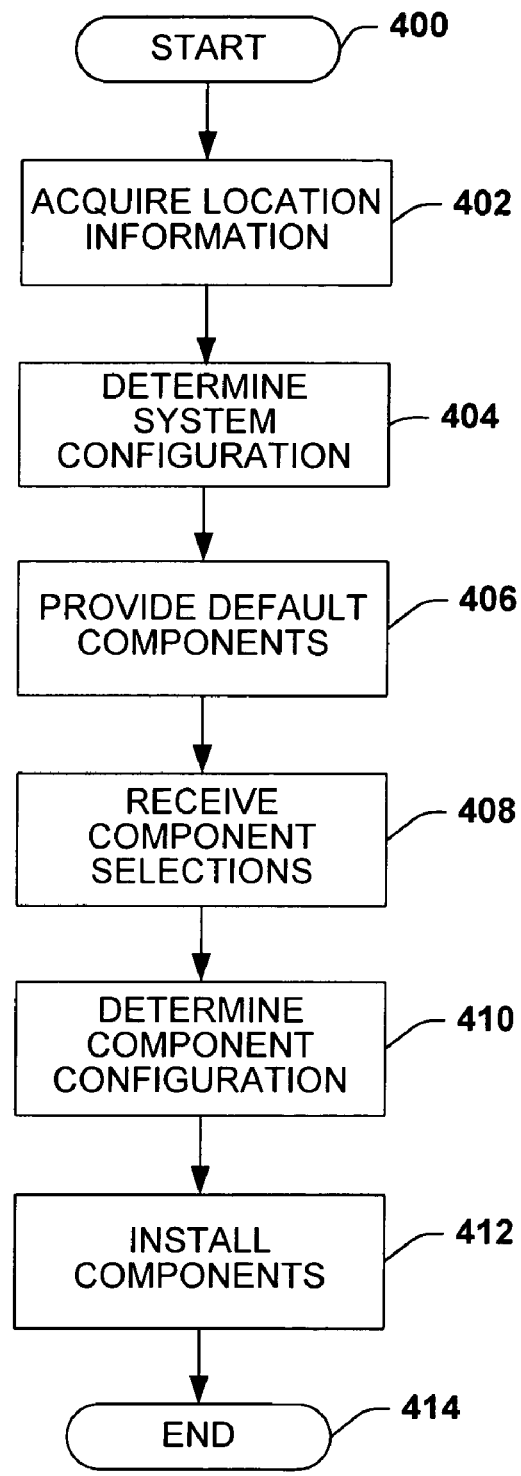
FIG. 9 is a flow diagram illustrating a methodology for configuring a software system in accordance with the present invention.

In view of the foregoing structural, functional, and graphical features described above, a methodology in accordance with various aspects of the present invention will be better appreciated with reference to FIG. 9. While, for purposes of simplicity of explanation, the methodology of FIG. 9 is shown and described as a series of steps, it is to be understood and appreciated that the present invention is not limited by the order of steps, as some steps may, in accordance with the present invention, occur in different orders and/or concurrently with other steps from that shown and described herein. Moreover, not all illustrated steps may be required to implement a methodology in accordance with an aspect of the present invention.

The process begins at step 400, such as in response to activating a setup and/or installation process for a software system having a plurality of application and/or service components. From step 400, the process proceeds to step 402 in which location information is acquired. For example, the location information may be acquired in response to a user manually selecting one of two or more location scenarios that describe possible installation locations. Alternatively or additionally, information may be read from system memory (e.g., a registry), from a distributed directory of a domain to which the computer is connected, and/or the information may be sensed from the network configuration. The information may be processed to deduce the location information for the computer where the software system is being installed.

The location information, for example, may correspond to one of a predetermined number of location scenarios where a user may desire to install the software system. By way of further illustration, when the software corresponds to a server system, one location scenario may correspond to a central server and a second scenario may correspond to a branch office server.

From step 402, the process proceeds to 404 in which the system configuration is determined. More specifically, system configuration is determined as a function of the location scenario (step 402). A system configuration may be stored in memory in connection with each possible location scenario. Next, at step 406, default components are provided according to the determined system configuration. The default components include those components favorable for operation of the software system for the location scenario. By way of example, certain components and/or sub-components may be applicable to a software system installed at one of the location scenarios, while other components and/or sub-components may be useful for all of the location scenarios. That is, the default components may be determined based on assumptions made in connection with how the software system should be configured when the software system is installed for a particular location scenario. A list of the default components may be provided to the user via an appropriate GUI (see, e.g., FIG. 7). A user may, in turn, customize the setup/installation, such as by deselecting one or more of the default components and/or selecting other components to be installed. The process then proceeds to step 408.

At step 408, component selections are received. For example, the component selections may correspond to an acceptance of all the default components and sub-components provided at step 406. Alternatively or additionally, the component selections may correspond to a customized component selection, which may include additional components and/or less than all the default components. A suitable user interface element may be provided to submit the selected components for installation.

Next, at step 410, component configuration is determined for the selected components and sub-components. In particular, certain components may be configured to provide desired functionality according to the selected location scenario for the installation. Such functionality may be implemented by providing different sub-components in dependence upon the location scenario. As a result, the functionality of the selected components may be tuned as a function of the location scenario and configuration characteristics associated with the system installation.

Next, the process proceeds to step 412 in which the selected components and sub-components there are installed. The installed components thus provide functionality specific to the selected location scenario. In this way, the installation/setup process is facilitated both to the user and to the resulting software system that is installed. In particular, a user typically is clear as to where a software system is to be installed. Based on the selected location and certain assumptions about the configuration of a system at such a location the installation may be adapted to provide the user with options and defaults tuned to the particular configuration being implemented. From step 412, the process proceeds to step 414 where the process may end.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer-implemented system that facilitates configuration of a software system being installed comprising the following computer-executable components:
    an interface component that obtains location scenario information pertaining to a location of a device within a network upon which the software system is to be installed;
    a setup component that configures the software system based at least in part upon the information pertaining to the location of the device within the network by providing at least one recommended, selectable component for installation corresponding to such location.

2. The system of claim 1, the software system further comprises a plurality of available components, the setup component selects default components for installation from the plurality of available components based on the location scenario information.

3. The system of claim 2, further comprising a component selection user interface that identifies the default components and, in response to receiving a user input, selects which of the plurality of available components of the software system are to be installed, the operating characteristics for at least some of the selected components being controlled as a function of the location scenario information.

4. The system of claim 1, the setup component further comprises a location user interface component that presents at least two location scenarios associated with installation of the software system, the location user interface component sets the location scenario in response to receipt of an associated user input.

5. The system of claim 1, further including computer-executable instructions associated with the setup component for accessing stored system information and determining configuration characteristics associated with a location onto where the software system is being installed, the location scenario being determined based on the configuration characteristics.

6. The system of claim 1, the software system is a server system that has a plurality of server components and the location scenario information is selected from at least two scenarios including a central server scenario and a branch office server scenario.

7. A computer-implemented system for facilitating configuration of a software system being installed, comprising:
    computer-implemented means for identifying a location scenario associated with a position of a computer where the software system is to be installed within a network; and
    computer-implemented means for determining a configuration for the software system based on the position of the computer within the network by yielding a default, customizable subset of software system components.

8. A method for configuring a software system comprising the following computer-executable acts:
    selecting a scenario based on a location of a device where the software system is to be installed with respect to disparate devices; and
    determining a configuration for the software system based on the selected scenario by providing a default, modifiable subset of software system components for installation corresponding to the location of the device.

9. The method of claim 8, the software system includes a plurality of components, determining further comprising determining at least one default component to install from the plurality of components based on the selected scenario.

10. The method of claim 9, further comprising providing a user interface which identifies the at least one default component.

11. The method of claim 10, further including selecting which of the plurality of components are to be installed and controlling operating characteristics of at least some of the selected components as a function of the selected scenario.

12. The method of claim 8, further comprising presenting at least two possible location scenarios via an associated user interface, selecting further comprising selecting the scenario from one of presented scenarios.

13. The method of claim 8, selecting further comprises accessing stored system information and determining configuration characteristics associated with a location onto where the software system is being installed, the selected scenario being determined based on the determined configuration characteristics.

14. The method of claim 8, the software system is a server system having a plurality of server components and the selected scenario is selected from at least two scenarios including a central server scenario and a branch office server scenario.

15. A computer-readable medium having computer-executable instructions stored thereon for:
  receiving data indicative of a location scenario corresponding to a location in a network of a device where a software system is to be installed; and
  configuring the software system based on the location scenario by tuning an adjustable list of recommended software system components for installation based upon the location in the network.

16. The computer-readable medium of claim 15, having further computer-executable instructions for determining at least one default component to install from a plurality of available components based on the location scenario.

17. The computer-readable medium of claim 16, having further computer-executable instructions for providing an interactive user interface that identifies the at least one default component.

18. The computer-readable medium of claim 17, having further computer-executable instructions for selecting which components of the software system are to be installed based on user input via the user interface and controlling operating characteristics of at least some of the selected components as a function of the location scenario.

19. The computer-readable medium of claim 15, having further computer-executable instructions for providing a user interface that presents at least two possible location scenarios and for receiving instructions via the user interface for selecting the location scenario from the presented scenarios.

20. The computer-readable medium of claim 19, the software system is a server system having a plurality of server components, the computer-readable medium having further computer-executable instructions for presenting the at least two possible location scenarios to include a central server scenario and a branch office server scenario.

21. The computer-readable medium of claim 15, having further computer-executable instructions for accessing stored system information and determining configuration characteristics associated with a location onto where the software system is being installed, the location scenario being determined based on the determined configuration characteristics.

\* \* \* \* \*